United States Patent
Pande et al.

(10) Patent No.: US 9,160,410 B2
(45) Date of Patent: Oct. 13, 2015

(54) COEXISTENCE METHOD BY REQUESTING ACCESS TO THE CHANNEL

(71) Applicant: Texas Instruments Incorporated, Dallas, TX (US)

(72) Inventors: Tarkesh Pande, Dallas, TX (US); Ramanuja Vedantham, Allen, TX (US); Il Han Kim, Dallas, TX (US); Anand G. Dabak, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 165 days.

(21) Appl. No.: 13/665,343

(22) Filed: Oct. 31, 2012

(65) Prior Publication Data

US 2013/0121425 A1    May 16, 2013

Related U.S. Application Data

(60) Provisional application No. 61/553,376, filed on Oct. 31, 2011.

(51) Int. Cl.
| | | |
|---|---|---|
| *H04L 12/413* | (2006.01) | |
| *H04J 3/02* | (2006.01) | |
| *H04L 25/00* | (2006.01) | |
| *H04B 3/54* | (2006.01) | |

(52) U.S. Cl.
   CPC .......... *H04B 3/54* (2013.01); *H04B 2203/5408* (2013.01)

(58) Field of Classification Search
   None
   See application file for complete search history.

(56) References Cited

U.S. PATENT DOCUMENTS

| | | | |
|---|---|---|---|
| 8,098,645 B2* | 1/2012 | Yee et al. | 370/345 |
| 2004/0001538 A1* | 1/2004 | Garrett | 375/229 |
| 2004/0233837 A1* | 11/2004 | Ray | 370/207 |
| 2005/0169363 A1* | 8/2005 | Logvinov et al. | 375/240 |
| 2005/0180453 A1* | 8/2005 | Gaskill | 370/465 |
| 2006/0198387 A1* | 9/2006 | Yonge et al. | 370/437 |
| 2009/0207865 A1* | 8/2009 | Yonge et al. | 370/503 |
| 2011/0014910 A1* | 1/2011 | Yonge et al. | 455/434 |
| 2011/0150104 A1* | 6/2011 | Koga et al. | 375/257 |
| 2011/0200058 A1* | 8/2011 | Mushkin et al. | 370/475 |
| 2013/0003879 A1* | 1/2013 | Balleste et al. | 375/257 |

* cited by examiner

*Primary Examiner* — Faruk Hamza
*Assistant Examiner* — Cassandra Decker
(74) *Attorney, Agent, or Firm* — Steven A. Shaw; Frank D. Cimino

(57) ABSTRACT

Systems and methods for implementing coexistence by requesting access to a channel in power line communications (PLC) are described. In an illustrative embodiment, a method performed by a PLC device, such as a PLC meter, may include detecting a communication from foreign PLC device on a PLC network in response to a foreign preamble received by the PLC device, determining whether a threshold back-off duration has been reached, and transmitting a channel access request in response to a determination that the threshold back-off duration has been reached.

28 Claims, 5 Drawing Sheets

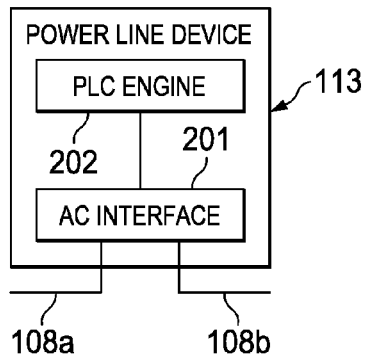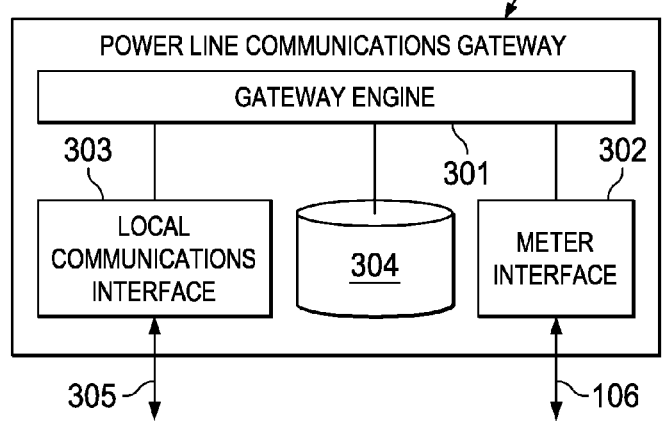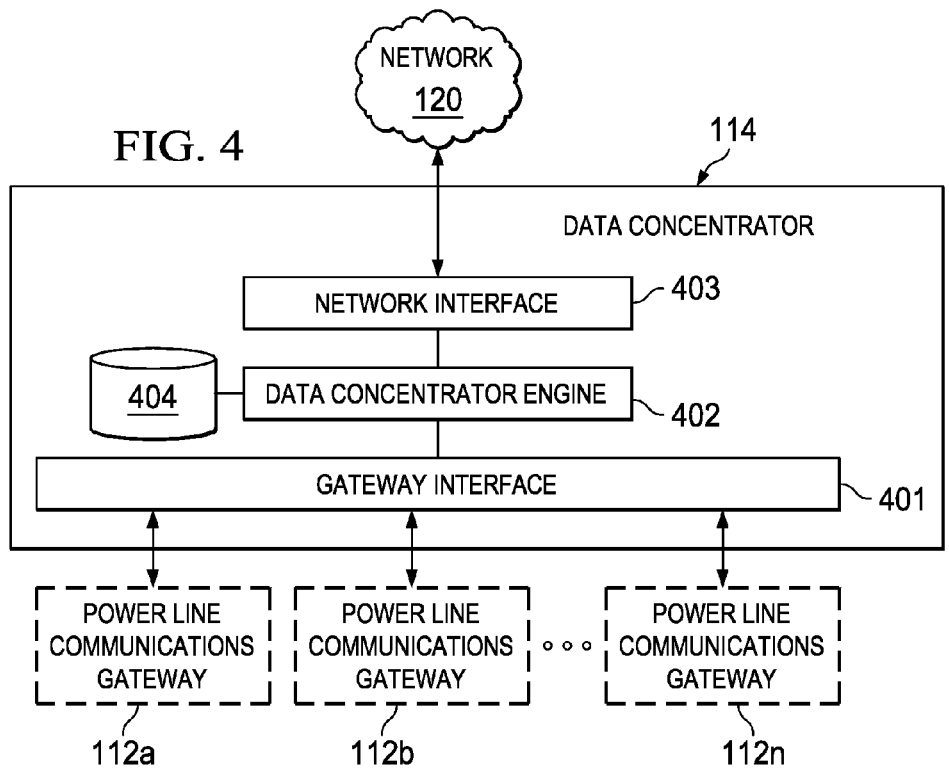

COEXISTENCE METHOD BY REQUESTING ACCESS TO THE CHANNEL

CROSS-REFERENCE TO RELATED APPLICATION(S)

This application claims the benefit of the filing date of U.S. Provisional Patent Application No. 61/553,376, which is titled "Coexistence Method by Requesting Access to the Channel" and was filed on Oct. 31, 2011, the disclosure of which is hereby incorporated by reference herein in its entirety.

BACKGROUND

Power line communications (PLC) include systems for communicating data over the same medium that is also used to transmit electric power to residences, buildings, and other premises, such as wires, power lines, or other conductors. In its simplest terms, PLC modulates communication signals over existing power lines. This enables devices to be networked without introducing any new wires or cables. This capability is extremely attractive across a diverse range of applications that can leverage greater intelligence and efficiency through networking. PLC applications include utility meters, home area networks, lighting, and solar.

Using PLC to communicate with utility meters enable applications such as Automated Meter Reading (AMR) and Automated Meter Infrastructure (AMI) communications without the need to install additional wires. Consumers may also use PLC to connect home electric meters to an energy monitoring device or in-home display monitor their energy consumption and to leverage lower-cost electric pricing based on time-of-day demand.

As the home area network expands to include controlling home appliances for more efficient consumption of energy, OEMs may use PLC to link these devices and the home network. PLC may also support home and industrial automation by integrating intelligence into a wide variety of lighting products to enable functionality such as remote control of lighting, automated activation and deactivation of lights, monitoring of usage to accurately calculate energy costs, and connectivity to the grid.

PLC may also serve as an important enabling technology for the mass deployment of solar equipment by providing a communication channel to solar inverters for monitoring and managing power across the grid by utility companies. While radio frequency (RF) communications have made some progress in solar installations, PLC offers an ideal means for connecting equipment with high reliability and at a low cost on DC or AC lines.

PLC is a generic term for any technology that uses power lines as a communications channel. Various PLC standardization efforts are currently in work around the world. The different standards focus on different performance factors and issues relating to particular applications and operating environments. Two of the most well-known PLC standards are G3 and PRIME. G3 has been approved by the International Telecommunication Union (ITU). IEEE is developing the IEEE P1901.2 standard that is based on G3. Each PLC standard has its own unique characteristics.

The manner in which PLC systems are implemented depends upon local regulations, characteristics of local power grids, etc. The frequency band available for PLC users depends upon the location of the system. In Europe, PLC bands are defined by the CENELEC (European Committee for Electrotechnical Standardization). The CENELEC-A band (3 kHz-95 kHz) is exclusively for energy providers. The CENELEC-B, C, D bands are open for end user applications, which may include PLC users. Typically, PLC systems operate between 35-90 kHz in the CENELEC A band using 36 tones spaced 1.5675 kHz apart. In the United States, the FCC has conducted emissions requirements that start at 535 kHz and therefore PLC standards define band-plans for FCC which are less than 500 kHz e.g. IEEE P1901.2 operates at 154.6875 kHz-487.5 kHz using 72 tones spaced at 4.6875 kHz apart. In other parts of the world different frequency bands are used, such as the Association of Radio Industries and Businesses (ARIB)-defined band in Japan, which operates less than 450 kHz, and the Electric Power Research Institute (EPRI)-defined bands in China, which operates at 3-90 kHz.

SUMMARY

Systems and methods for implementing coexistence by requesting access to a channel in power line communications (PLC) are described. In an illustrative embodiment, a method performed by a PLC device, such as a PLC meter, may include detecting a communication from foreign PLC device on a PLC network in response to a foreign preamble received by the PLC device, determining whether a threshold back-off duration has been reached, and transmitting a channel access request in response to a determination that the threshold back-off duration has been reached.

In one embodiment, the method further includes waiting a for a hold period after transmitting the channel access request before initiating data transmissions on the channel. The method may also include initiating data transmission on the channel in response to a determination that the hold period has expired. In such an embodiment, the hold period may be a predetermined period of time.

In a further embodiment, the method may include backing off data transmission from the channel in response to a determination that the threshold back-off duration has not been reached. Accordingly, the back-off duration may be determined by the coexistence Extended Interframe Space (cEIFS) defined for the network.

In one embodiment, the channel access request may include a plurality of preamble symbols in a sequence. For example, the number preamble symbols may be determined in response to a maximum packet size supported by the network. Alternatively, the number of preamble symbols is determined in response to a maximum detected packet size of the coexisting PLC devices. The channel access request may include a plurality of syncP preamble symbols. Alternatively, the channel access request may include a plurality of syncC preamble symbols.

A power line communication (PLC) device is also presented. In one embodiment, the PLC device includes a processor, and a memory coupled to the processor. The memory may be configured to store program instructions executable by the processor to cause the PLC device to detect a communication from foreign PLC device on a PLC network in response to a foreign preamble received by the PLC device, determine whether a threshold back-off duration has been reached, and transmit a channel access request in response to a determination that the threshold back-off duration has been reached.

In one embodiment, the channel access request comprises one or more symbols, each symbol configured such that energy associated with the symbol is concentrated within a native band of frequencies. In such an embodiment, the native band of frequencies overlaps a foreign band of frequencies associated with coexisting PLC devices in the network.

In some embodiments, one or more of the methods described herein may be performed by one or more PLC devices (e.g., a PLC meter, PLC data concentrator, etc.). In other embodiments, a tangible electronic storage medium may have program instructions stored thereon that, upon execution by a processor within one or more PLC devices, cause the one or more PLC devices to perform one or more operations disclosed herein. Examples of such a processor include, but are not limited to, a digital signal processor (DSP), an application specific integrated circuit (ASIC), a system-on-chip (SoC) circuit, a field-programmable gate array (FPGA), a microprocessor, or a microcontroller. In yet other embodiments, a PLC device may include at least one processor and a memory coupled to the at least one processor, the memory configured to store program instructions executable by the at least one processor to cause the PLC device to perform one or more operations disclosed herein.

BRIEF DESCRIPTION OF THE DRAWINGS

Figure 1:
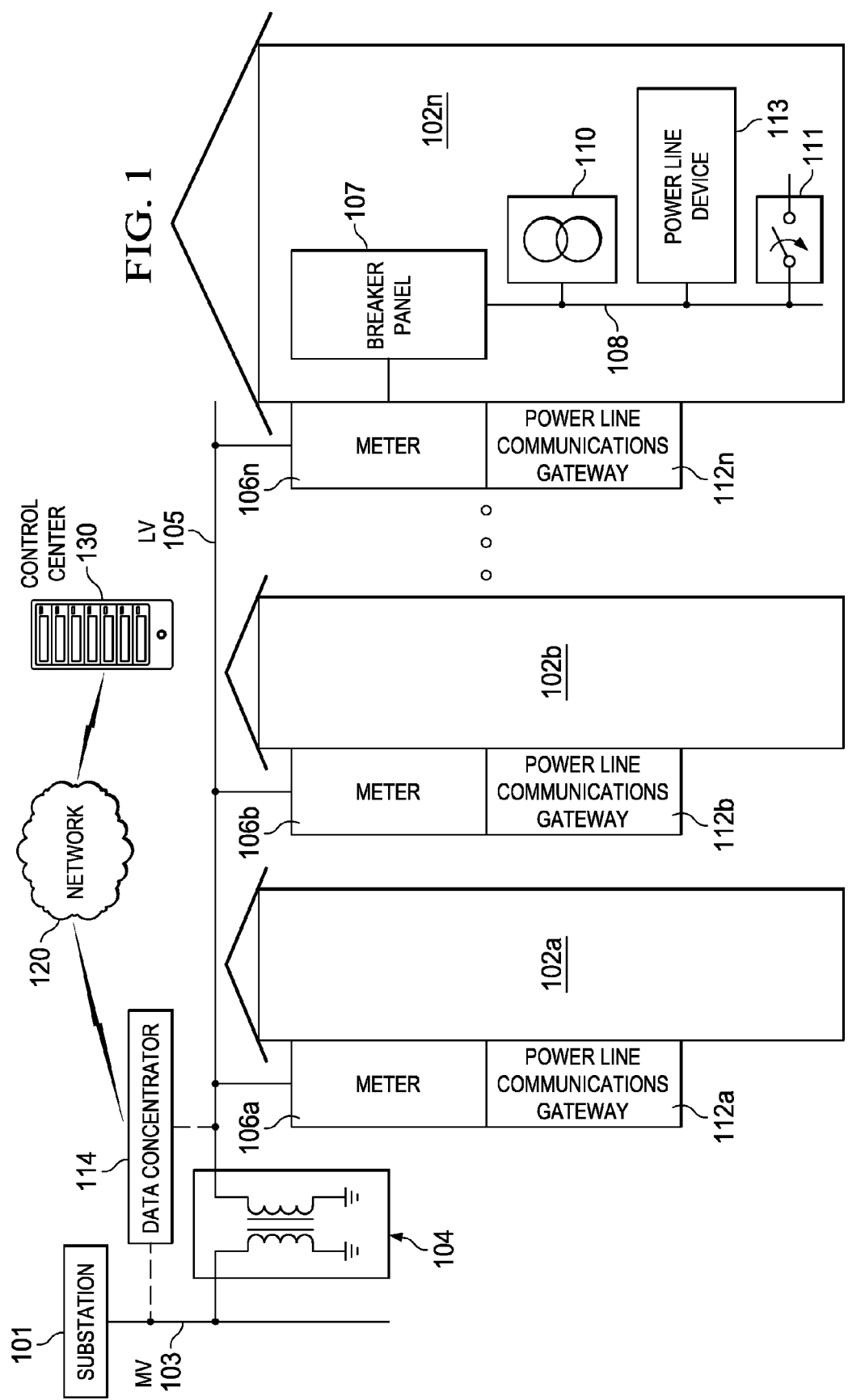

Having thus described the invention(s) in general terms, reference will now be made to the accompanying drawings, wherein:

FIG. 1 is a diagram of a PLC system according to some embodiments.

FIG. 2 is a block diagram of a PLC device or modem according to some embodiments.

FIG. 3 is a block diagram of a PLC gateway according to some embodiments.

FIG. 4 is a block diagram of a PLC data concentrator according to some embodiments.

Figure 5:
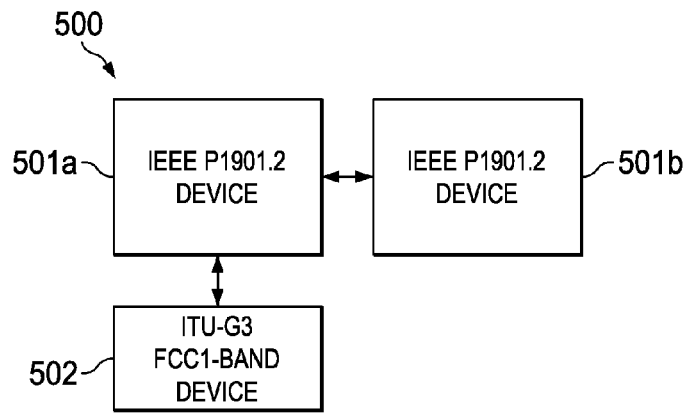

FIG. 5 is a block diagram illustrating one embodiment of a PLC system for coexistence.

Figure 6A:
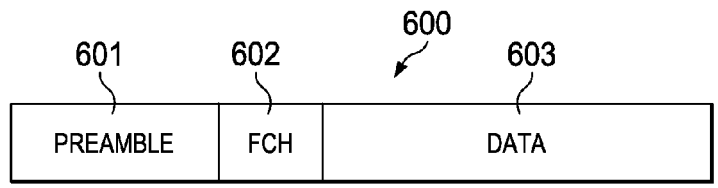

FIG. 6A is a diagram illustrating one embodiment of a data packet for transmission between PLC devices.

Figure 6B:
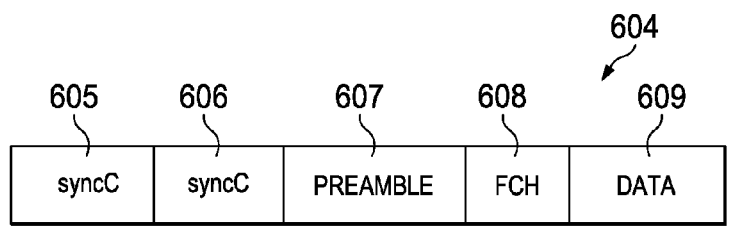

FIG. 6B is a diagram illustrating another embodiment of a data packet for transmission between PLC devices.

Figure 7:
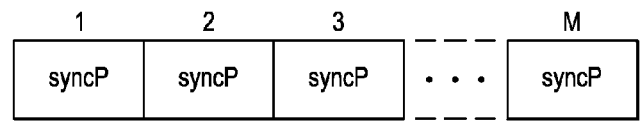

FIG. 7 is a diagram illustrating one embodiment of a preamble configured for a requesting access to a communication channel.

Figure 8:
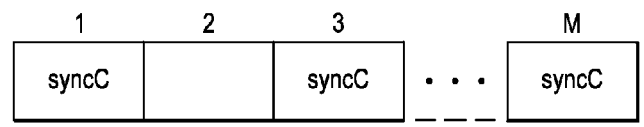

FIG. 8 is a diagram illustrating another embodiment of a preamble configured for requesting access to a communication channel.

Figure 9:
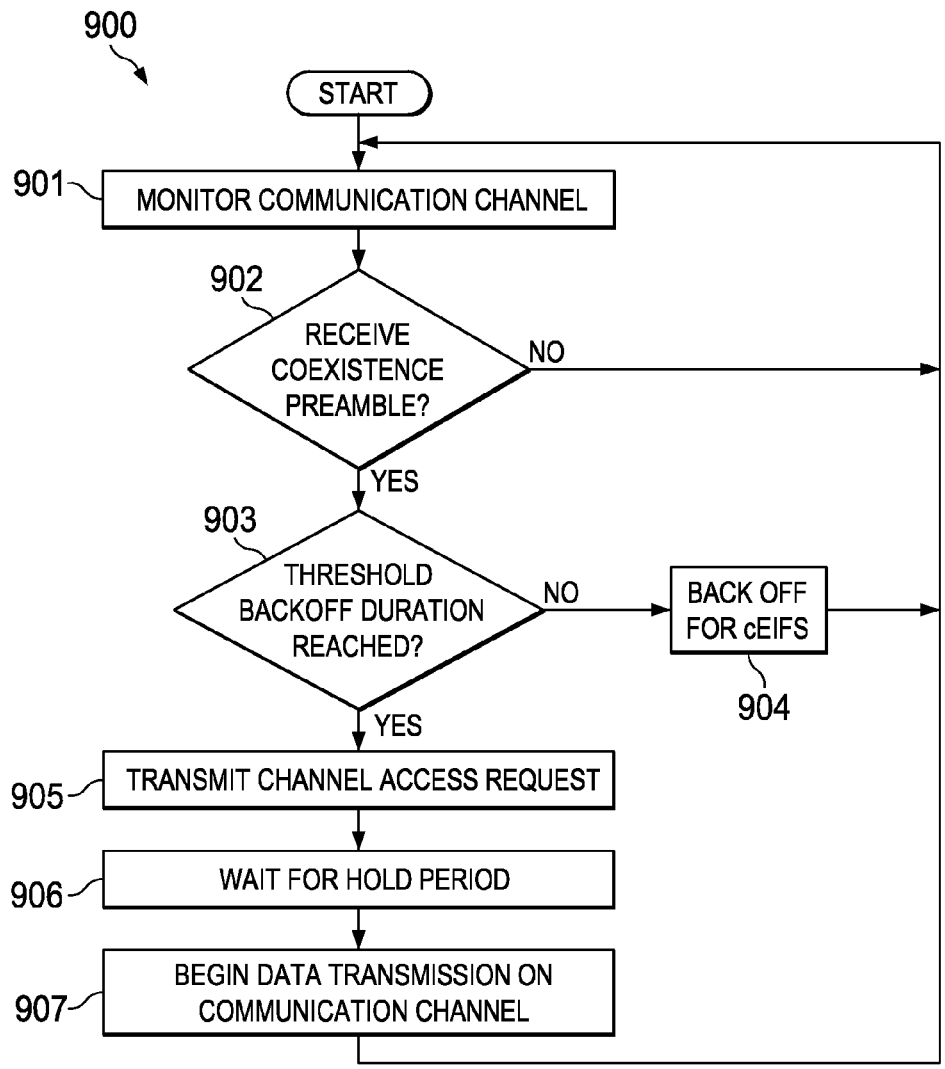

FIG. 9 is a schematic flowchart diagram illustrating one embodiment of a method for requesting access to a communication channel.

Figure 10:
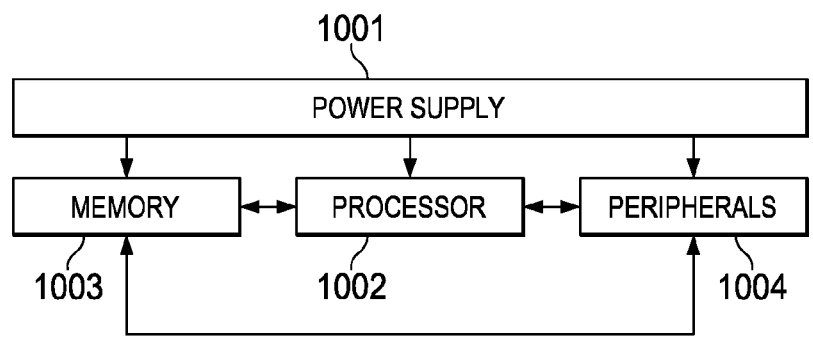

FIG. 10 is a block diagram of an integrated circuit according to some embodiments.

Figure 11:
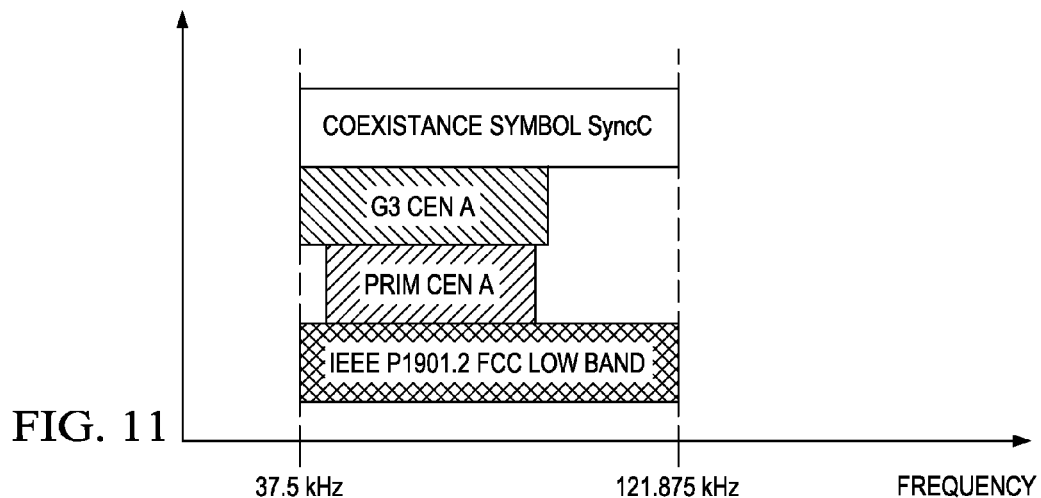

FIG. 11 illustrates one embodiment of co-existence symbols in a band-plan for CEN-A band deployments.

Figure 12:
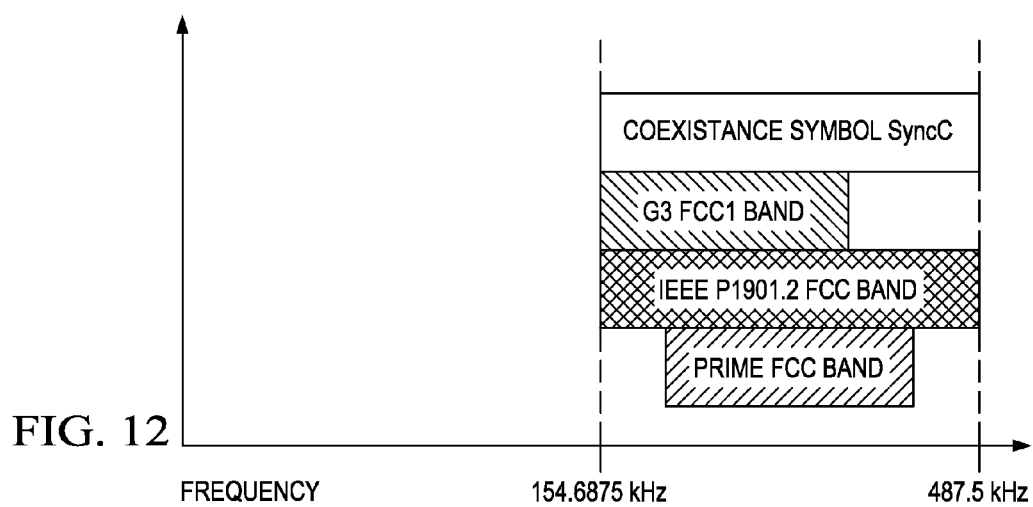

FIG. 12 illustrates one embodiment of co-existence symbols in a band-plan for FCC band deployments.

Figure 13:
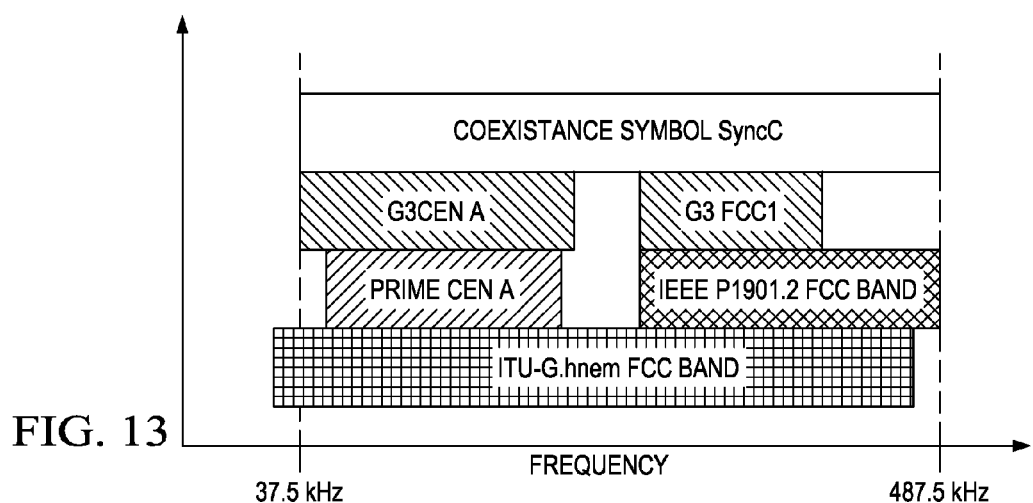

FIG. 13 illustrates one embodiment of co-existence symbols in a band-plan for CEN-A & FCC band deployments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

FIG. 1 illustrates a power line communication (PLC) system according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. Although referred to as "residences," premises 102a-n may include any type of building, facility, electric vehicle charging station, or other location where electric power is received and/or consumed. A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use a carrier signal having a frequency different from that of the power signal. The carrier signal may be modulated by the data, for example, using an OFDM technology or the like described, for example, by the PRIME, G3 or IEEE 1901 standards.

PLC modems or gateways 112a-n at residences 102a-n use the MV/LV power grid to carry data signals to and from PLC data concentrator or router 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more PLC data concentrators or routers 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

FIG. 2 is a block diagram of PLC device 113 according to some embodiments. As illustrated, AC interface 201 may be coupled to electrical wires 108*a* and 108*b* inside of premises 112*n* in a manner that allows PLC device 113 to switch the connection between wires 108*a* and 108*b* off using a switching circuit or the like. In other embodiments, however, AC interface 201 may be connected to a single wire 108 (i.e., without breaking wire 108 into wires 108*a* and 108*b*) and without providing such switching capabilities. In operation, AC interface 201 may allow PLC engine 202 to receive and transmit PLC signals over wires 108*a-b*. In some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112*n* (e.g., street lighting, etc.).

PLC engine 202 may be configured to transmit and/or receive PLC signals over wires 108*a* and/or 108*b* via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108*a*, and/or 108*b*. PLC engine 202 may receive such power consumption information, encode it as one or more PLC signals, and transmit it over wires 108, 108*a*, and/or 108*b* to higher-level PLC devices (e.g., PLC gateways 112*n*, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

FIG. 3 is a block diagram of PLC gateway 112 according to some embodiments. As illustrated in this example, gateway engine 301 is coupled to meter interface 302, local communication interface 304, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZIGBEE, BLUETOOTH, WI-FI, WI-MAX, ETHERNET, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102*n* and serve as a gateway to all PLC communications to and/or from premises 102*n*. In other embodiments, however, PLC gateway 112 may be absent and PLC devices 113 (as well as meter 106*n* and/or other appliances) may communicate directly with PLC data concentrator 114. When PLC gateway 112 is present, it may include database 304 with records of frequency bands currently used, for example, by various PLC devices 113 within premises 102*n*. An example of such a record may include, for instance, device identification information (e.g., serial number, device ID, etc.), application profile, device class, and/or currently allocated frequency band. As such, gateway engine 301 may use database 304 in assigning, allocating, or otherwise managing frequency bands assigned to its various PLC devices.

FIG. 4 is a block diagram of PLC data concentrator or router 114 according to some embodiments. Gateway interface 401 is coupled to data concentrator engine 402 and may be configured to communicate with one or more PLC gateways 112*a-n*. Network interface 403 is also coupled to data concentrator engine 402 and may be configured to communicate with network 120. In operation, data concentrator engine 402 may be used to collect information and data from multiple gateways 112*a-n* before forwarding the data to control center 130. In cases where PLC gateways 112*a-n* are absent, gateway interface 401 may be replaced with a meter and/or device interface (now shown) configured to communicate directly with meters 116*a-n*, PLC devices 113, and/or other appliances. Further, if PLC gateways 112*a-n* are absent, frequency usage database 404 may be configured to store records similar to those described above with respect to database 304.

FIG. 5 illustrates one embodiment of a system 500 in which devices of different standards or protocols may operate together in coexistence. In this example, the system 500 may include a first IEEE P1901.2 FCC device 501*a* and a second IEEEP1901.2 FCC device 501*b*. In addition, the system 500 may include an ITU-G3 FCC1-band device 502. One of ordinary skill in the art may recognize that FCC devices IEEEP1901.2 501*a-b* may operate on different but overlapping frequency bands than the ITU-G3 FCC1-band device and be configured to generate preambles of different formats. Nonetheless, when configured according the present embodiments, IEEEP1901.2 FCC devices 501*a-b* and ITU-G3 FCC1 device 502 may co-exist in the same system.

In an alternative embodiment, the system may include devices operating according to different standards or protocols that all communication on the FCC frequencies. For example, the system may include G3 devices that operate according to ITU or IEEE standards, such as IEEE P1901.2. The system may also include devices that operate according to the PRIME standard. The present embodiments may also enable co-existence between these devices.

FIG. 6A illustrates one embodiment of a data packet 600 that may be communicated between the devices 501-502 of FIG. 5. In one embedment, the data packet 600 may include a preamble 601, a frame control header (FCH) 602, and a sequence of data payload 603. When devices communicate, they may detect a preamble 601. In one embodiment, the first FCC device 501*a* may determine whether the incoming data packet 600 is of a native format (i.e., from the second FCC device 501*b*) or is of a foreign format (i.e., from ITUG3-FCC1 device 502) by detecting and analyzing the preamble 601.

FIG. 6B illustrates one embodiment of a data packet 604 that may be communicated between the devices 501-502 of FIG. 5. In one embodiment the data packet 604 may include two syncC symbols, a preamble 607, a frame control header (FCH) 608 and data payload 609. When devices communicate, the receiver first looks for the two syncC symbols and then its preamble. In one embodiment, the first FCC device 501*a* may determine whether the incoming data packet 600 is of a native format (i.e., from the second FCC device 501*b*) if and only if both syncC symbols and the preamble are detected or it is of a foreign format (i.e., from ITU G3-FCC1 device 502) if either syncC symbols and the foreign preamble is detected or if syncC symbols are detected and the native preamble is not detected.

In networks where there are several different devices with different technology parameters (i.e., devices using one of G.hnem, IEEP1901.2 FCC-low band, IEEP1901.2 FCC band, IEEP1901.2 CEN-A, PRIME CEN-A, PRIME FCC or one of the configurations in Table 1 for transmission) then a common back-off time for all devices in the network referred to as cEIFS (coexistence Extended Interframe Space) may also be defined whereby a device will back-off for cEIFS if it detects a preamble. cEIFS can be a PAN specific parameter. Even in this case a scenario may arise where devices from one technology may dominate network access as is illustrated below.

TABLE 1

Example Band plans that different technologies can use

| | Band-Plan | Band-Frequencies |
|---|---|---|
| 1 | IEEE P1901.2 FCC Band | 154.6875 kHz-487.5 kHz |
| 2 | ITU-G3 ARIB Band | 154.6875 kHz-403 kHz |
| 3 | ITU-G3 FCC1 Band | 154.6875 kHz-262 kHz |
| 4 | ITU-G.hnem FCC Band | 35 kHz-480 kHz |
| 5 | IEEE P1901.2 FCC Multitone 36-1 | 154.6875 kHz-318 kHz |
| 6 | IEEE P1901.2 FCC Multitone 36-2 | 323 kHz-487.5 kHz |
| 7 | IEEE P1901.2 FCC Low Band | 37.5 kHz-121.875 kHz |
| 8 | IEEE/G3 CEN-A | 35 kHz-90 kHz |
| 9 | PRIME CEN-A | 41.9 kHz-88.8 kHz |

For example, communication may be dominated by the first IEEE P1901.2 FCC device 501a and the second IEEE P1901.2 FCC device 501b because there are more IEEE P1901.2 FCC devices communicating in the network than ITU-G3 FCC1 devices 502. The present embodiments enable fair channel access for different technologies in a coexistence system 500, regardless of the number of devices of each technology exist in the system 500.

Embodiments define a coexistence preamble sequence. An example of a coexistence preamble sequences are the coexistence preamble sequence consists of M repeated preambles 701a-M as shown in FIG. 7. In one embodiment, each repeated preambles may be a syncP format preamble as shown. The value M can be chosen such that the coexistence sequence 700 is as large as the maximum packet size supported by that technology. The preamble syncP corresponds to the preamble 601 of the native technology. Alternatively a new preamble syncC specific for coexistence may be defined. An alternative embodiment of a channel access request using sync preambles 801a-M is shown in FIG. 8. The value M may be chosen such that the co-existence sequence 800 is as large as the maximum packet size supported by all the technologies competing for channel access present in the network. The value M may also be a PAN specific parameter, which is set upon deployment. In some embodiments, the value M may be chosen by the device depending on the number of competing technologies the device detects.

In some embodiments the SyncP or SyncC symbol may be defined as an OFDM symbol with selected subcarriers modulated with phase values between (0-2 pi]. The subcarriers may be chosen such that receiver for a given technology (PRIME, ITU-G3, IEEE P1901.2) will exhibit a good correlation upon correlating with the known symbol in either time or frequency domain. In some embodiments, the SyncP or SyncC symbols can consists of chirp sequences, a pseudo-random bit sequence, barker sequence or an arbitrary +/−1 sequence.

The co-existence symbol SyncC may be designed such that they occupy different band-plans as shown in Table 2. This allows for more signal energy to be concentrated on a specific band if co-existence for technologies within a certain band is required. As an example, if co-existence for technologies within CENELEC band is required, then only the set of subcarriers in the syncC symbol occupying frequencies 37.5 kHz-121.875 kHz are modulated with predefined phases and the rest of the subcarriers are set to zero. This is illustrated as in Table 3 and FIG. 11. If co-existence for technologies within FCC band (>145 kHz) is required, then only the set of subcarriers in the syncC symbol occupying frequencies 154.6875 kHz-487.5 kHz are modulated with predefined phases and the rest of the subcarriers are set to zero. This is illustrated as in Table 4 and FIG. 12. If co-existence for technologies within FCC+CENELEC band (35 kHz-500 kHz) is required, then only the set of subcarriers in the syncC symbol occupying frequencies 37.5 kHz-487.5 kHz are modulated with predefined phases and the rest of the subcarriers are set to zero. This is illustrated as in Table 5 and FIG. 13.

TABLE 2

Example Band plans that a co-existence symbol can use

| | Band-Plan | Band-Frequencies |
|---|---|---|
| 1 | Co-ex symbol for CENELEC only | 37.5 kHz-121.875 kHz |
| 2 | Co-ex symbol for FCC only (>145 kHz) | 154.6875 kHz-487.5 kHz |
| 3 | Co-ex for CEN + FCC (35 kHz-500 kHz) | 37.5 kHz-487.5 kHz |

TABLE 3

Co-existence in the CENELEC Band

| | Band-Plan | Band-Frequencies |
|---|---|---|
| 1 | IEEE P1901.2 FCC Low Band | 37.5 kHz-121.875 kHz |
| 2 | IEEE/G3 CEN-A | 35 kHz-90 kHz |
| 3 | PRIME CEN-A | 41.9 kHz-88.8 kHz |
| | Co-existence Symbol (SyncC) | 37.5 kHz-121.875 kHz |

TABLE 4

Co-existence in FCC- Band

| | Band-Plan | Band-Frequencies |
|---|---|---|
| 1 | IEEE P1901.2 FCC Band | 154.6875 kHz-487.5 kHz |
| 2 | G3 ARIB Band | 154.6875 kHz-403 kHz |
| 3 | G3 FCC1 Band | 154.6875 kHz-262 kHz |
| 4 | IEEE P1901.2 FCC Multitone 36-1 | 154.6875 kHz-318 kHz |
| 5 | IEEE P1901.2 FCC Multitone 36-2 | 323 kHz-487.5 kHz |
| | Co-existence Symbol (SyncC) | 154.6875 kHz-487.5 kHz |

TABLE 5

Co-existence in CENELEC and FCC- Band

| | Band-Plan | Band-Frequencies |
|---|---|---|
| 1 | IEEE P1901.2 FCC Low Band | 37.5 kHz-121.875 kHz |
| 2 | IEEE/G3 CEN-A | 35 kHz-90 kHz |
| 3 | PRIME CEN-A | 41.9 kHz-88.8 kHz |
| 4 | IEEE P1901.2 FCC Full Band | 37.5 kHz-487.5 kHz |
| 5 | ITU- G.hnem FCC Band | 35 kHz-480 kHz |
| | Co-existence Symbol (SyncC) | 37.5 kHz-487.5 kHz |

Embodiments of methods for coexistence channel access are also described. Such embodiments may describe methods for determining when the coexistence preamble sequence will be transmitted. For example, if ITU-G3 FCC1 device 502 has attempted to access the channel N times for transmission and has backed off for N cEIFS durations then the device 502 may transmit a co-existence preamble sequence 700, 800. Transmission of the coexistence preamble sequence 700, 800 is a way of requesting channel access from devices of the different technologies, for example, FCC devices IEEE P1901.2 501*a,b*, that are using the channel. In one embodiment, if the coexistence preamble sequence 700, 800 is long enough, then there will be a time slot in which only the coexistence preamble sequence 700, 800 is present in the channel resulting in, for example IEEE P1901, FCC devices 501*a-b*, to backing off and release the channel.

Embodiments further describe a time duration (Xms) for when a packet 600 can potentially be transmitted after transmission of a coexistence preamble 700, 800 has been transmitted. An example is the transmission of a packet is done after a time duration corresponding to the preamble length of the technology being used. As an example for ITU-G3-FCC1, the preamble length corresponds to 9.5 syncP symbol durations.

For example, FIG. 9 illustrates one embodiment of a method 900 for channel access. The method 900 may include monitoring 901 a communication channel. In one embodiment, the device may continue to monitor 901 the communication channel so long as no coexistence preamble is detected. If, while monitoring 901 the communication channel, a PLC device receives 902 a coexistence preamble and then either fails to detect the native preamble or detects a preamble from a different technology, then a further determination 903 may be made as to whether a threshold limit of backoff duration has been reached. For example, if the device has backed off N back-off durations then the threshold may have been reached. Alternatively, if the device has backed off for a threshold period of time or received a threshold number of coexistence parameters without having an opportunity to transmit a data packet then it may be determined that the threshold backoff duration has been reached 903. If the threshold has not been reached, then the device may back off 904 for a specified time period. In an embodiment, the specified time period may be the duration of cEIFS.

On the other hand, if at block 903 it is determined that the threshold time period has been reached, then the device may be configured to transmit a channel access request 905. In one embodiment, the channel access request may be configured as shown in FIG. 7. Alternatively, the channel access request may be configured as shown in FIG. 8. The device may then be configured to wait 906 for a predetermined period of time. This may allow the other devices in the network 500 to back off. Once the time period has expired, the device may then begin 907 data transmissions on the communication channel by transmitting data packets 600 substantially as described in FIG. 6.

FIG. 10 is a block diagram of a circuit for implementing methods for requesting access to a communication channel in a PLC system according to some embodiments. In some cases, one or more of the devices and/or apparatuses shown in FIGS. 1-4 may be implemented as shown in FIG. 10. In some embodiments, processor 1002 may be a digital signal processor (DSP), an application specific integrated circuit (ASIC), a system-on-chip (SoC) circuit, a field-programmable gate array (FPGA), a microprocessor, a microcontroller, or the like. Processor 1002 is coupled to one or more peripherals 1104 and external memory 1003. In some cases, external memory 1003 may be used to store and/or maintain databases 304 and/or 404 shown in FIGS. 3 and 4. Further, processor 1002 may include a driver for communicating signals to external memory 1003 and another driver for communicating signals to peripherals 1004. Power supply 1001 provides supply voltages to processor 02 as well as one or more supply voltages to memory 1003 and/or peripherals 1004. In some embodiments, more than one instance of processor 1002 may be included (and more than one external memory 1003 may be included as well).

Peripherals 1004 may include any desired circuitry, depending on the type of PLC system. For example, in an embodiment, peripherals 1004 may implement local communication interface 303 and include devices for various types of wireless communication, such as WI-FI, ZIGBEE, BLUETOOTH, cellular, global positioning system, etc. Peripherals 1004 may also include additional storage, including RAM storage, solid-state storage, or disk storage. In some cases, peripherals 1004 may include user interface devices such as a display screen, including touch display screens or multi-touch display screens, keyboard or other input devices, microphones, speakers, etc.

External memory 1003 may include any type of memory. For example, external memory 1003 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, DRAM, etc. External memory 1003 may include one or more memory modules to which the memory devices are mounted, such as single inline memory modules (SIMMs), dual inline memory modules (DIMMs), etc.

It will be understood that in various embodiments, the modules shown in FIGS. 2-4 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the modules shown in FIGS. 2-4 may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method comprising:
performing, by a power line communication (PLC) device,
detecting a communication from a foreign PLC device on a PLC network in response to a foreign preamble received by the PLC device;
determining whether a threshold back-off duration has been reached; and
transmitting a channel access request in response to a determination that the threshold back-off duration has been reached,
wherein the channel access request comprises a plurality of preamble symbols in a sequence,
wherein the number of preamble symbols is determined in response to a maximum packet size supported by technology used by at least the PLC device and the foreign PLC device.

2. The method of claim 1, wherein the plurality of preamble symbols comprises a plurality of syncP preamble symbols.

3. The method of claim 1, wherein the plurality of preamble symbols comprises a plurality of syncC preamble symbols.

4. The method of claim 1, wherein each symbol of the channel access request is configured such that energy associated with the symbol is concentrated within a native band of frequencies.

5. The method of claim 4, wherein the native band of frequencies overlaps a foreign band of frequencies associated with coexisting PLC devices including at least the foreign PLC device in the PLC network.

6. A method comprising:
performing, by a power line communication (PLC) device,
detecting a communication from a foreign PLC device on a PLC network in response to a foreign preamble received by the PLC device;
determining whether a threshold back-off duration has been reached; and
transmitting a channel access request in response to a determination that the threshold back-off duration has been reached,
wherein the channel access request comprises a plurality of preamble symbols in a sequence,
wherein the number of preamble symbols is determined in response to a maximum detected packet size of coexisting PLC devices including at least the foreign PLC device and the PLC device.

7. The method of claim 6, wherein the plurality of preamble symbols comprises a plurality of syncP preamble symbols.

8. The method of claim 6, wherein the plurality of preamble symbols comprises a plurality of syncC preamble symbols.

9. The method of claim 6, wherein each symbol of the channel access request is configured such that energy associated with the symbol is concentrated within a native band of frequencies.

10. The method of claim 9, wherein the native band of frequencies overlaps a foreign band of frequencies associated with coexisting PLC devices including at least the foreign PLC device in the PLC network.

11. A power line communication (PLC) device, comprising:
a processor; and
a memory coupled to the processor, the memory configured to store program instructions executable by the processor to cause the PLC device to:
detect a communication from a foreign PLC device on a PLC network in response to a foreign preamble received by the PLC device;
determine whether a threshold back-off duration has been reached; and
transmit a channel access request in response to a determination that the threshold back-off duration has been reached,
wherein the channel access request comprises a plurality of preamble symbols in a sequence,
wherein the number of preamble symbols is determined in response to a maximum packet size supported by technology used by at least the PLC device and the foreign PLC device.

12. The PLC device of claim 11, the processor further configured to:
wait for a hold period after transmitting the channel access request before initiating data transmissions on the channel.

13. The PLC device of claim 12, the processor further configured to:
initiate data transmission on the channel in response to a determination that the hold period has expired.

14. The PLC device of claim 11, the processor further configured to:
back off data transmission from the channel in response to a determination that the threshold back-off duration has not been reached.

15. The PLC device of claim 14, wherein the back-off duration is determined by the coexistence Extended Interframe Space (cEIFS) defined for the PLC network.

16. The PLC device of claim 11, wherein the plurality of preamble symbols are syncP preamble symbols.

17. The PLC device of claim 11, wherein the plurality of preamble symbols are syncC preamble symbols.

18. The PLC device of claim 11, wherein each symbol of the channel access request is configured such that energy associated with the symbol is concentrated within a native band of frequencies.

19. The PLC of claim 18, wherein the native band of frequencies overlaps a foreign band of frequencies associated with coexisting PLC devices including at least the foreign PLC device in the PLC network.

20. A power line communication (PLC) device, comprising:
a processor; and
a memory coupled to the processor, the memory configured to store program instructions executable by the processor to cause the PLC device to:
detect a communication from a foreign PLC device on a PLC network in response to a foreign preamble received by the PLC device;
determine whether a threshold back-off duration has been reached; and
transmit a channel access request in response to a determination that the threshold back-off duration has been reached, the channel access request comprising a plurality of preamble symbols in a sequence, wherein the number of preamble symbols is determined in response to a maximum detected packet size of coexisting PLC devices including at least the foreign PLC device and the PLC device.

21. The PLC device of claim 20, wherein the plurality of preamble symbols are syncP preamble symbols.

22. The PLC device of claim 20, wherein the plurality of preamble symbols are syncC preamble symbols.

23. The PLC device of claim 20, wherein each symbol of the channel access request is configured such that energy associated with the symbol is concentrated within a native band of frequencies.

24. The PLC of claim 23, wherein the native band of frequencies overlaps a foreign band of frequencies associated with coexisting PLC devices including at least the foreign PLC device in the PLC network.

25. The PLC device of claim 20, the processor further configured to:

wait for a hold period after transmitting the channel access request before initiating data transmissions on the channel.

26. The PLC device of claim 25, the processor further configured to:

initiate data transmission on the channel in response to a determination that the hold period has expired.

27. The PLC device of claim 20, the processor further configured to:

back off data transmission from the channel in response to a determination that the threshold back-off duration has not been reached.

28. The PLC device of claim 27, wherein the back-off duration is determined by the coexistence Extended Interframe Space (cEIFS) defined for the PLC network.

* * * * *